(12) United States Patent
Stehlin

(10) Patent No.: US 12,429,831 B2
(45) Date of Patent: Sep. 30, 2025

(54) ELECTRONIC WATCH

(71) Applicant: ETA SA Manufacture Horlogere Suisse, Grenchen (CH)

(72) Inventor: Xavier Stehlin, Cudrefin (CH)

(73) Assignee: ETA SA Manufacture Horlogere Suisse, Grenchen (CH)

(*) Notice: Subject to any disclaimer, the term of this patent is extended or adjusted under 35 U.S.C. 154(b) by 421 days.

(21) Appl. No.: 17/970,137

(22) Filed: Oct. 20, 2022

(65) Prior Publication Data

US 2023/0195050 A1 Jun. 22, 2023

(30) Foreign Application Priority Data

Dec. 17, 2021 (EP) .................................. 21215636

(51) Int. Cl.
G04R 60/08 (2013.01)
G06F 3/03 (2006.01)
H01Q 1/27 (2006.01)

(52) U.S. Cl.
CPC ............... *G04R 60/08* (2013.01); *G06F 3/03* (2013.01); *H01Q 1/273* (2013.01)

(58) Field of Classification Search
CPC ........... G06F 3/03; H01Q 1/273; G04G 21/08
USPC .......................................................... 368/10
See application file for complete search history.

(56) References Cited

U.S. PATENT DOCUMENTS

| | | | | |
|---|---|---|---|---|
| 10,271,299 | B1 * | 4/2019 | Sayem | H04W 64/00 |
| 2009/0059730 | A1 * | 3/2009 | Lyons | G04G 21/08 |
| | | | | 368/69 |
| 2014/0168872 | A1 * | 6/2014 | Heck | G04G 17/08 |
| | | | | 361/679.03 |
| 2014/0225786 | A1 * | 8/2014 | Lyons | H01Q 9/40 |
| | | | | 343/702 |
| 2018/0067639 | A1 * | 3/2018 | Balaram | G04G 21/08 |
| 2018/0088724 | A1 * | 3/2018 | Erentok | G06F 3/033 |
| 2019/0025768 | A1 | 1/2019 | Dangy Caye | |
| 2019/0265655 | A1 | 8/2019 | Naka et al. | |

FOREIGN PATENT DOCUMENTS

| | | | | |
|---|---|---|---|---|
| CH | 708730 A2 * | 4/2015 | | H03K 17/962 |
| EP | 2 317 602 A1 | 5/2011 | | |
| JP | 2007-170994 A | 7/2007 | | |

(Continued)

OTHER PUBLICATIONS

European Search Report for EP 21 21 5636 dated May 14, 2022.

*Primary Examiner* — Edwin A. Leon
*Assistant Examiner* — Kevin Andrew Johnston
(74) *Attorney, Agent, or Firm* — Sughrue Mion, PLLC

(57) ABSTRACT

An electronic watch including a case provided with a middle and with a bezel entirely or partially forming a tactile interface, the case including an electronic device including an electronic circuit provided with a substrate wherein a peripheral area of its upper surface forms with the bezel mounted over the middle a hatch within which are included an antenna circuit of a communication module and a tactile control circuit of a tactile control member of the electronic device, the tactile control circuit including at least one cambered element made of a conductive material forming an electrode one end of which is connected to a connection terminal of the tactile control member which is comprised over the peripheral area of the upper surface of the substrate.

14 Claims, 2 Drawing Sheets

(56) References Cited

FOREIGN PATENT DOCUMENTS

| | | |
|---|---|---|
| JP | 2011-97431 A | 5/2011 |
| JP | 6959232 B2 | 11/2021 |
| KR | 10-20180103969 A | 9/2018 |
| WO | WO-2014083001 A2 * 6/2014 | ........... H03K 17/962 |
| WO | 2019/135856 A1 | 7/2019 |

* cited by examiner

ELECTRONIC WATCH

CROSS REFERENCE TO RELATED APPLICATION

This application claims priority to European Patent Application No. 21215636.8 filed Dec. 17, 2021, the entire contents of which are incorporated herein by reference.

TECHNICAL FIELD OF THE INVENTION

The invention relates to an electronic watch comprising a bezel forming with a substrate of an electronic circuit, a hatch comprising a tactile control circuit and an antenna circuit of a communication module of said watch.

TECHNOLOGICAL BACKGROUND

Many portable electronic objects that could connect to communication networks are known in the prior art such as electronic watches which are provided with tactile interfaces conventionally arranged in the crystals of these. In general, such tactile interfaces are used to improve the interactivity of the watches and to simplify manipulations thereof in particular when these offer a large number of menus and functions.

In order to be able to connect to communication networks such as Bluetooth-type or geolocation-related networks, such electronic objects comprise communication means conventionally integrating an antenna. It is known that the optimum size of such an antenna depends directly on the wavelength of the emitted/received signal. Indeed, an antenna with an optimum length allows sending/receiving a signal in its entirety and at full power.

In these watches, the available space being limited, an antenna should have a suitable design in order to be integrated in the case of the watch. And if the watch integrates a radio communication means which operates over radio frequencies (such as 2.4 GHz or 1.5 GHz), the size of the product becomes critical with regards to the wavelength (120 mm and 200 mm).

Moreover, other constraints should also be taken into account because these watches include many metallic portions and because an antenna should be isolated therefrom.

In this context, one could understand that there is a need to find a solution, in particular one that does not have the drawbacks of the prior art.

SUMMARY OF THE INVENTION

One of the aims of the invention is to provide a watch, comprising a tactile interface and integrating an antenna circuit having an optimum length to send/receive a signal in its entirety and at full power and intended to be fitted into the case of this watch whose receiving volume is limited.

Another aim of the invention is to obtain an electronic watch whose aesthetics, energy consumption and manufacturing costs are not affected or barely affected by the integration of a tactile interface into a bezel of this watch in particular an antenna circuit.

Another aim of the invention is to obtain an electronic watch whose aesthetics, energy consumption and manufacturing costs are not affected or barely affected by the integration of a tactile control circuit and an antenna circuit into a bezel of this watch.

For this purpose, the invention relates to an electronic watch comprising a case provided with a middle and with a bezel entirely or partially forming a tactile interface, said case comprising an electronic device including an electronic circuit provided with a substrate wherein a peripheral area of its upper surface forms with said bezel mounted over the middle a hatch within which are comprised an antenna circuit of a communication module and a tactile control circuit of a tactile control member of the electronic device, said tactile control circuit comprising at least one cambered element (25) made of a conductive material forming an electrode one end of which is connected to a connection terminal of said tactile control member which is comprised over the peripheral area of the upper surface of the substrate.

In other embodiments:
- said cambered element comprises another end which is free;
- said cambered element comprises first and second rectilinear or substantially rectilinear portions which are linked together by a third curved portion of this element;
- said cambered element comprises a second portion provided with a free end which is arranged entirely or partially proximate to or in contact with a portion of an inner face of a body of the bezel arranged beneath at least one tactile area of the bezel defined over an outer face of this body;
- the antenna circuit comprises first and second strands each having a proximal end and a distal end, and extending in parallel between their proximal and distal ends, the first and second strands being connected together at their distal ends as well as at their proximal ends;
- the antenna circuit is entirely or partially comprised over the upper face of the peripheral area of the substrate or over an inner face of a body of the bezel;
- the communication module comprises a microcircuit connected to a connecting portion of the antenna circuit via a connection terminal comprised over the upper face of the substrate;
- the control circuit comprises a microcontroller connected to said at least one electrode via the connection terminal comprised over the upper face of the substrate;
- the bezel is manufactured in at least one dielectric and/or electrically non-conductive material;
- the watch is a watch in particular a smartwatch comprising the bezel which is a bezel entirely or partially forming a tactile interface.
- the antenna circuit and the tactile control circuit are located in the bezel on either side of an axis of symmetry passing through the centre of the bezel;
- the cambered element is partially comprised over the upper surface of the substrate in particular the end of this cambered element which is the only portion of said element that is comprised over this upper surface while being connected to a connection terminal.

BRIEF DESCRIPTION OF THE FIGURES

Other features and advantages of the present invention will appear more clearly from the following detailed description, made with reference to the appended figures listed hereinbelow.

DETAILED DESCRIPTION OF THE INVENTION

Figure 1:
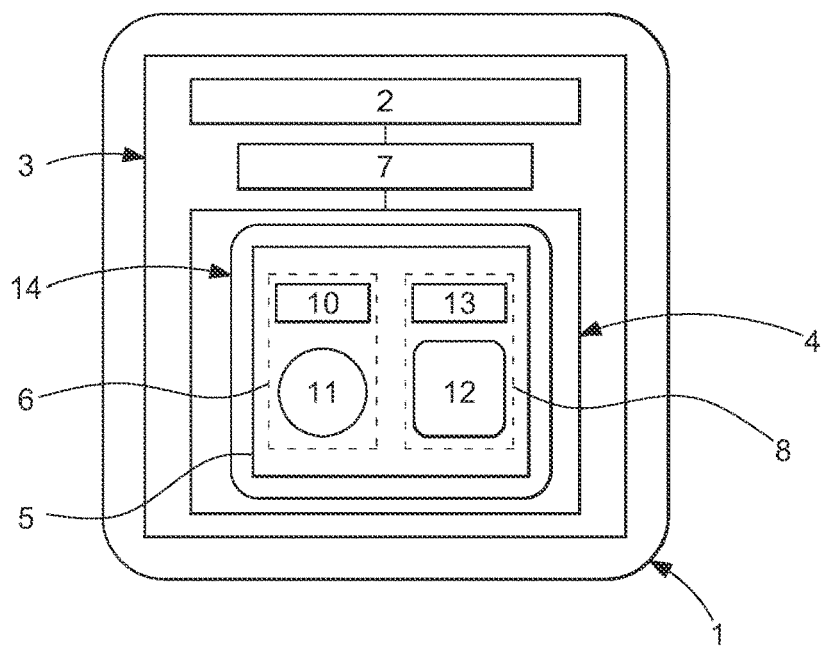
FIG. 1 is a schematic representation of an electronic watch comprising a bezel entirely or partially forming a tactile interface of said watch, according to an embodiment of the invention.
Figure 2A:
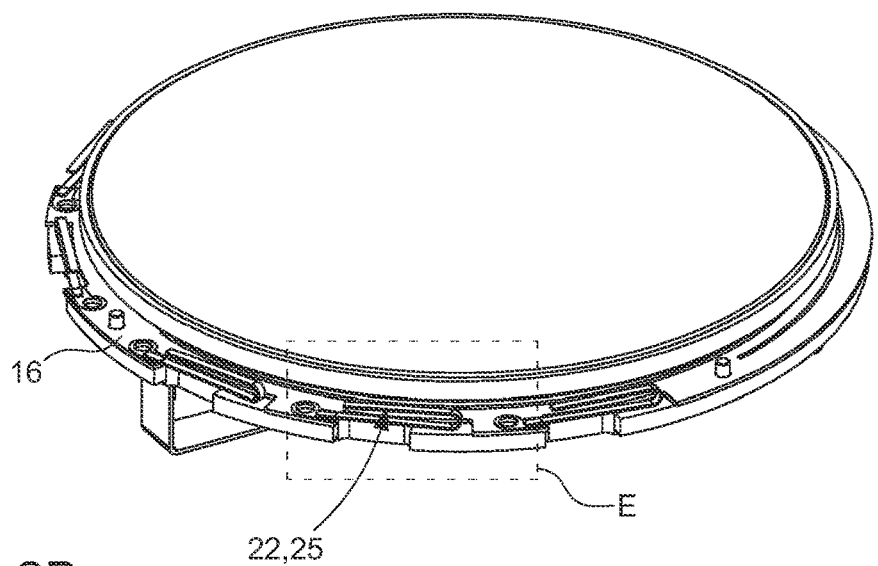
FIG. 2A is a representation of a portion of a case of the watch comprising a substrate of an electronic circuit of the watch comprising a tactile control circuit, according to the embodiment of the invention.
Figure 2B:
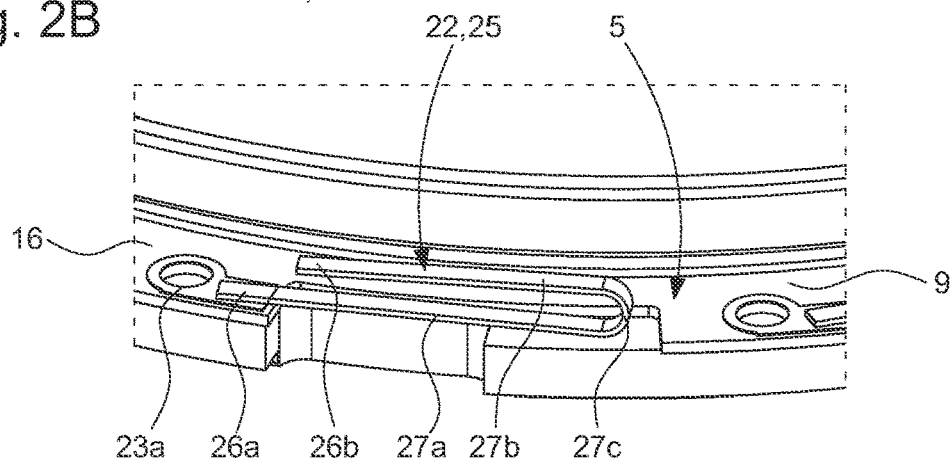
FIG. 2B is a view at a larger scale of the portion E of FIG. 2A, according to the embodiment of the invention.

Referring to FIG. 1, the invention covers an electronic watch 1 such as a smartwatch. In this context, such an electronic watch 1 is provided with a case 3 including a bezel 2 entirely or partially forming a tactile interface of said electronic watch 1 through which a wearer of said watch 1 could interact with the latter for example in order to control horological functions of this watch 1. This case 3 also includes a middle which could be made of metal (for example of steel, preferably stainless steel), of a synthetic material (for example of a composite material comprising a polymer matrix reinforced with fibres, typically carbon fibres) or of ceramic or else of at least one dielectric and/or electrically non-conductive material. The case 3 also comprises a back and a crystal which contribute to form with the middle, a closed space of this case 3.

In particular, a display device 7 and an electronic device 4 of said electronic watch 1 are arranged within such a space. The display device 7 includes display elements which could be analog such as hands and/or digital such as a LCD, LED or OLED screen. Such a display device 7 is located between the crystal and the electronic device 4, a spacer or flange could be arranged between the crystal and this display device 7.

As regards the electronic device 4, it comprises an electronic horological movement. It is configured to provide at least one piece of information having to be displayed on this display device 7. Non-exhaustively and without limitation, this electronic device 4 includes a communication module 6, a control module of the portable watch, an electrical energy accumulator in particular a battery as well as different sensors such as sensors involved in the determination of a geolocation, an altitude or a temperature of a location or in the determination of physiological, biometric, vital and/or behavioural parameters of the wearer of the electronic watch 1.

It should be noted that in this configuration, the control module enables the wearer of such an electronic watch 1 to be able to interact with the latter in particular by being able to activate/deactivate/select different functions—for example horological functions—that could be implemented by this electronic watch 1. This control module comprises a tactile control member 8 and in some alternatives other control members such as push-pieces or buttons arranged on the middle.

In the electronic device 4, the communication module 6 comprises an antenna circuit 10 connected to a microcircuit 11, and the tactile control member 8 comprises a microcontroller 12 connected to a tactile control circuit 13. More specifically, this device 4 comprises a printed circuit 14 including the microcontroller 12 of the control member 8 and a microcircuit 11 of the communication module 6. This printed circuit 14 comprises a substrate 5 wherein a peripheral area 9 of its upper surface 17 forms with said bezel 2 mounted on the middle, a hatch within which the antenna circuit 10 and the tactile control circuit 13 are comprised.

Preferably, such a bezel 2 is fastened/mounted on the middle of the case 3 and clasps the crystal. It may consist of a rotating bezel or a fixed bezel. This bezel 2 may be a part removably fastened on the middle or else a part integrally made with this middle. It may consist of a monolithic part or conversely of a part made into several portions linked together in a reversible and/or tight manner, or into two portions linked together in a reversible and/or tight manner. The bezel 2 comprises a body provided with an inner face and with an outer face 17. The outer face 17 is a face of this bezel 2 visible to the wearer which could be manipulated at first and second tactile areas 18a, 18b defined over this face 17. The bezel 2 may comprise a graduation over its outer face 17. In the illustrated example, the graduation comprises figurative indexes 24 which are in the form of numerals (preferably Arabic numerals).

For the antenna circuit 10 and the control circuit 13 to operate effectively and/or optimally, this bezel 2 is made of at least one dielectric and/or electrically non-conductive material. Said at least one material allows contributing to the achievement of the capacitive effect of the tactile control member 8. This material is also involved in not deteriorating the radiation of the antenna circuit 10, enlarging its electric length and improving its efficiency with regards to its physical size. For example, such a material may be a polymer, titanium or a ceramic, or any other synthetic material. It should be noted that it is possible that the entire body of this bezel 2 is not made of this material type but only portions of this body:

opposite which are positioned/located the antenna circuit 10 and the control circuit 13 are made of this material, and/or comprising the first and second tactile areas 18a, 18b of the outer face 17 of the body of this bezel 2 are made of this material.

The body of the bezel 2 may comprise arrangements intended to provide access to a printed circuit 14 including the microcontroller 12 of the control member 8 and the microcircuit 11 of the communication module 6. Thus, such arrangements offer the possibility of forming a passage in this body of the bezel 2 in order to connect the control circuit 13, in particular the electrodes 22, and the antenna circuit 10 respectively to the microcontroller 12 of the control member 8 and to the microcircuit 11 of the communication module 6.

Referring to FIGS. 1 to 4, the control member 8 comprises the microcontroller 12 which is connected to the tactile control circuit 13. Such a tactile control circuit 13 comprises at least one cambered element 25 made of a conductive material forming an electrode 22 one end 26a of which is connected to a connection terminal 23a of the tactile control member 8 comprised over the upper surface 16 of the peripheral area 9 of the substrate 5.

This cambered element 25 comprises first and second portions 27a, 27b rectilinear or substantially rectilinear which are linked together by a third curved portion 27c of this element 25. As we have mentioned before, this cambered element 25 therefore comprises the first end 26a which is connected to the connection terminal 23a as well as a second end 26b which is so-called free. In this configuration, the first portion 27a comprises the first end 26a and the second portion is provided with the free end 26b. This second portion 27b is entirely or partially located proximate to and possibly in contact with a portion of the inner face of the body of the bezel 2 arranged beneath at least one tactile area 18*a*, 18*b* of the bezel 2 defined over an outer face 17 of this body.

The cambered element 25 forming the electrode 22 of the tactile control circuit 13, is partially comprised over the peripheral area 9 of the upper surface 16 of the substrate 5. In other words, only the first end 26*a* of this cambered element 25 which is connected to the connection terminal 23*a*, is comprised over this upper surface 16. Thus, it should be understood that except for the first end 26*a*, the rest of the body of the first portion 27*a* as well as the second and third portions 27*b*, 27*c* of this cambered element 25 are not comprised over the upper surface 16 of the substrate 5. In this configuration, the rest of the body of the first portion 27*a* as well as the second and third portions 27*b*, 27*c* of this cambered element 25 are then located between this upper surface 16 and the inner face of the bezel 2, the second portion 27*b* could be entirely or partially in contact with this inner face.

As we have mentioned before, the substrate 5 comprises the connection terminal 23*a* to which the first end 26*a* of the cambered element 25 forming the electrode 22 is connected. Thus, this connection terminal 23*a* allows linking/connecting this electrode 22 to the microcontroller 12 of the control member 8. In this configuration, the control member 8 comprises an electrical track 21 which could achieve the connection between each connection terminal 23*a* and the microcontroller 12. In this manner, each electrode 22 is thus connected to the microcontroller 12 from an electrical track 20. Finally, one could notice that the tactile control circuit 13 preferably comprises as many electrical tracks 21 as electrodes 22 that the control circuit 12 comprises.

Figure 3:
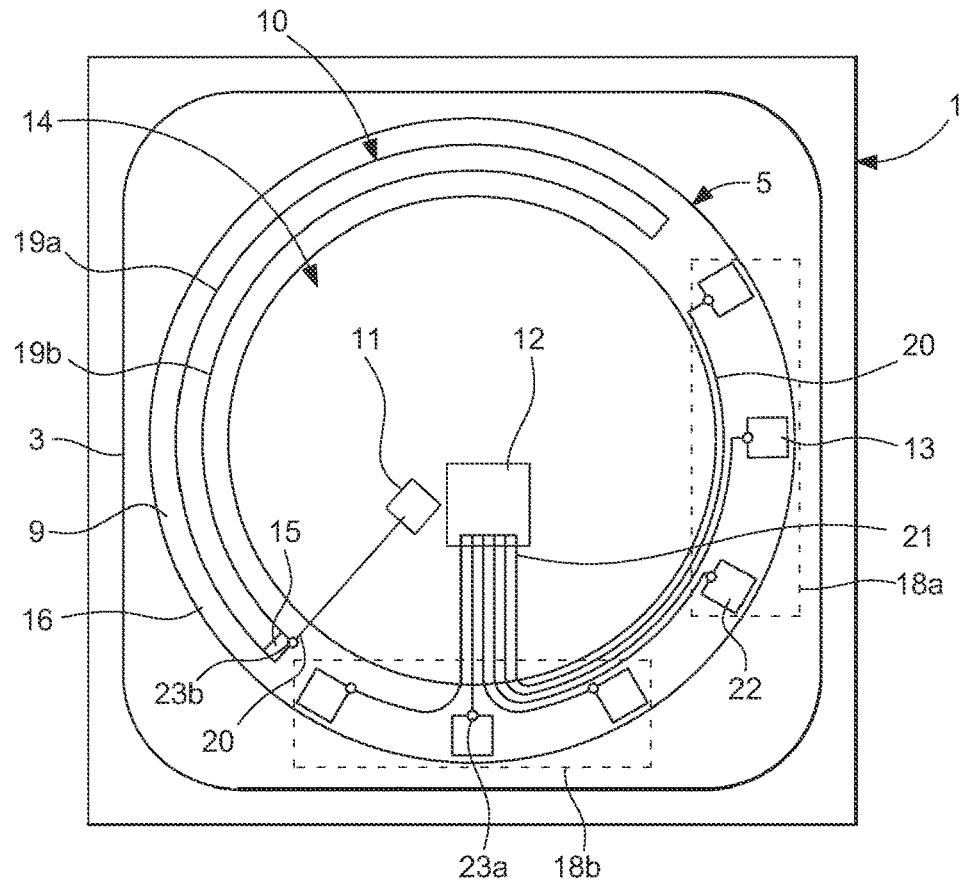
FIG. 3 is a schematic representation of the watch comprising a communication module and a tactile control member wherein the antenna circuit and the tactile control circuit are respectively arranged within a hatch formed by the bezel with a peripheral area of the substrate, according to the embodiment of the invention.
Figure 4:
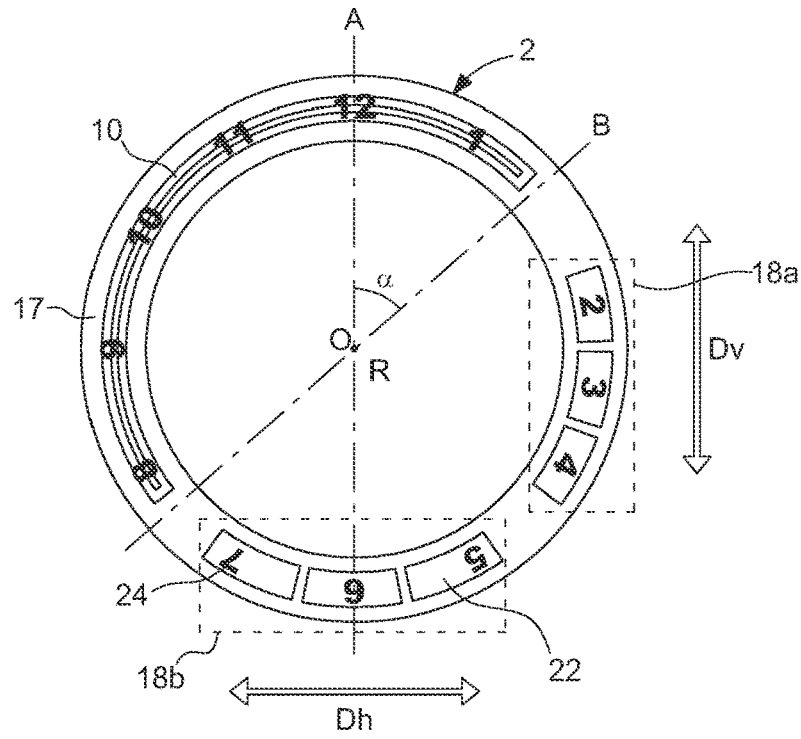
FIG. 4 represents the bezel of the electronic watch showing in transparency the antenna circuit and the tactile control circuit, according to the embodiment of the invention.

In FIGS. 3 and 4, the tactile control member 8 comprises six electrodes 22 distributed within the hatch formed by the body of the bezel 2 and the peripheral area 9 of the upper surface 16 of the substrate 5. More specifically, the cambered elements 25 forming these electrodes 22 are arranged within this hatch so as to define/form two distinct tactile areas 18*a*, 18*b* defined over the outer face 17 of this bezel 2, these two tactile areas 18*a*, 18*b* thus forming the tactile interface of the electronic watch 1.

In this configuration, this hatch comprises several electrodes 22 per tactile area 18*a*, 18*b*. The first tactile area 18*a* comprises three electrodes 22 respectively arranged beneath the indexes 24 two, three and four defined over the outer face 17 of the bezel 2. The second tactile area 18*b* also comprises three electrodes 22 respectively arranged beneath the indexes 24 five, six and seven defined over this outer face 17 of the bezel 2. In this configuration, the first tactile area 18*a* enables the wearer of the watch 1 to interact with the latter by performing a movement in particular a "vertical movement" (referenced Dv in FIG. 4) of an accessory such as a stylus or a tip of one of his limbs such as a finger over this first area 18*a*. As regards the second tactile area 18*b*, it enables the wearer of the watch 1 to interact with the latter by performing a movement in particular a "horizontal movement" (reference Dh in FIG. 4) of such an accessory or of the tip of one of his limbs over this area 18*b*. The vertical movement describes a trajectory which is substantially parallel or parallel to an axis of symmetry A of the bezel 2 passing through the centre O of this bezel 2 and this trajectory being also substantially perpendicular or perpendicular to an axis of revolution R of this bezel 2. As regards the horizontal movement, it describes a trajectory which, in turn, is substantially perpendicular or perpendicular to this axis A (or to the trajectory described by the vertical movement) and also to the axis of revolution R of this bezel 2. Such an axis A separates the bezel 2 into two equal parts/portions while connecting the indexes 24 twelve and six present over the outer face 17 of this bezel 2.

In the electronic device 4, the communication module 6 is able to enable the connection of the electronic watch 1 to a Bluetooth-type communication network. In other words, the communication module 6 is configured to communicate according to a Bluetooth-type protocol.

Alternatively, this communication module 6 could be able to enable the connection of the watch 1 to a GNSS (Geolocation and Navigation Satellite System) satellite location network, such as the GPS (Global Positioning System), Glonass or Galileo. This communication module 6 comprises the antenna circuit 10 connected to the microcircuit 11.

In the present embodiment, such an antenna circuit 10 is also comprised within the hatch formed by the body of the bezel 2 and the peripheral area 9 of the upper surface 16 of the substrate 5. This antenna circuit 10 comprises a connecting portion 15 and first and second strands 19*a*, 19*b* each having a proximal end and a distal end, and extending in parallel between their proximal and distal ends.

In this antenna circuit 10, the architecture with two strands in parallel allows enlarging the frequency band (100 MHz), necessary for example to communicate over a Bluetooth-type communication network (2.4 GHz). In this antenna circuit 10, the first and second strands 19*a*, 19*b* are connected by their distal ends as well as at their proximal ends. In this configuration, the antenna circuit 10 extends essentially according to a circular arc trajectory including two strands 19*a*, 19*b* arranged in parallel within this hatch which follows this trajectory.

This antenna circuit 10 comprises a connecting portion 15 which is linked to a connection terminal 23*b* of the communication module 6. This connection terminal 23*b* is comprised within the peripheral area 9 of the upper surface 16 of the substrate 5. In this antenna circuit 10, such a connecting portion 15 is located at the junction of the proximal ends or of the distal ends of its first and second strands 19*a*, 19*b*.

It should be understood that such a connection terminal 23*b* thus allows linking/connecting the antenna circuit 10 to the microcircuit 11 of the communication module 6 at the connecting portion 15. In this configuration, the communication module 6 comprises an electrical track 20 which could achieve the connection between the connection terminal 23*b* and the microcircuit 11.

This antenna circuit 10 is partially comprised over the upper surface 16 of the peripheral area 9 of the substrate 5. In other words, only the connecting portion 15 of the antenna circuit 10 which is linked to the connection terminal 23*b*, is comprised over this upper surface 16. Thus, it should be understood that except for this connecting portion 15, the rest of the body of the antenna circuit 10 is not comprised over the upper surface 16 of the substrate 5. In this configuration, the rest of the body of this antenna circuit 10 is located in the hatch between this upper surface 16 and the inner face of the bezel 2.

In one variant, the antenna circuit 10 may be entirely comprised over the upper surface 16 of the peripheral area 9 of the substrate 5 or over the inner face of the body of the bezel 2. In this context, this antenna circuit 11 and in particular the first and second strands 19*a*, 19*b* that form it, are made by a deposition over the inner face or the upper surface 16 of at least one layer of a conductive material and that being so, according to a technology of physical vapour deposition of a conductive material or a technology of micrometric-scale selective printing of this conductive material. A technology of screen-printing with silver over a substrate 5 made of polyester or with copper over a substrate 5 made of polyimide could also be considered.

In this watch 1, the antenna circuit 10 and the tactile control circuit 13 are located within said hatch formed by the bezel and the upper surface 16 of the substrate 5 and that being so, on either side of an axis of symmetry B passing through the centre O of the bezel 2 and which is substantially perpendicular or perpendicular to the axis of revolution R of this bezel 2. This axis referenced B separates the bezel 2 into two parts/portions and forms an angle α with the axis A which is comprised between 30 and 40 degrees and which is preferably 36 degrees. Thus, the antenna circuit 10 and the tactile control circuit 13 are entirely or partially located in the distinct parts/portions of the bezel 2 while being located in distinct areas of the hatch formed by the bezel 2 and the upper surface 17 of the substrate 5.

These two distinct areas or two parts/portions of the bezel 2 are separated by the axis of symmetry B. More specifically, the outer surface 17 of the bezel 2 therefore comprises two portions. The first portion includes the first and second strands 19a, 19b of this antenna circuit 10 and the second portion the electrodes 22.

It goes without saying that the present invention is not limited to the embodiment that has just been described and that various simple modifications and variants could be considered by a person skilled in the art without departing from the scope of the invention as defined by the appended claims.

The invention claimed is:

1. An electronic watch (1) comprising:
a case (3) provided with a middle and with a bezel entirely or partially forming a tactile interface,
said case (3) comprising an electronic device (4) including an electronic circuit (14) provided with a substrate (5) wherein a peripheral area (9) of an upper surface (16) of the substrate forms, with the bezel (2) mounted over the middle, a hatch within which are comprised an antenna circuit (10) of a communication module (6) and a tactile control circuit (13) of a tactile control member (8) of the electronic device (14),
said tactile control circuit comprising at least one cambered element (25) made of a conductive material forming an electrode (22) one end (26a) of which is connected to a connection terminal (23a) of said tactile control member (8) which is comprised over the peripheral area (9) of the upper surface (16) of the substrate (5),
wherein said cambered element (25) comprises first and second portions (27a, 27b) linked together by a third portion (27c) of said cambered element (25), at least a portion of said second portion overlapping said first portion.

2. The electronic watch (1) according to claim 1, wherein said cambered element (25) comprises another end (26b) which is free.

3. The electronic watch (1) according to claim 1, wherein said first and second portions are rectilinear or substantially rectilinear portions (27a, 27b) and the third portion (27c) of said cambered element (25) is a curved portion.

4. The electronic watch (1) according to claim 1, wherein said second portion (27b) is provided with a free end (26b) which is arranged entirely or partially proximate to or in contact with a portion of an inner face of a body of the bezel (2) arranged beneath at least one tactile area (18a, 18b) of the bezel (2) defined over an outer face (17) of this body.

5. The electronic watch (1) according to claim 1, wherein the antenna circuit (10) comprises first and second strands (19a, 19b) each having a proximal end and a distal end, and extending in parallel between their proximal and distal ends, the first and second strands (19a, 19b) being connected together at their distal ends as well as at their proximal ends.

6. The electronic watch (1) according to claim 1, wherein the antenna circuit (10) is entirely or partially comprised over the upper face (16) of the peripheral area (9) of the substrate (5) or over an inner face of a body of the bezel (2).

7. The electronic watch (1) according to claim 1, wherein the communication module (6) comprises a microcircuit (11) connected to a connecting portion (15) of the antenna circuit (10) via a connection terminal (23b) comprised over the upper face (16) of the substrate (5).

8. The electronic watch (1) according to claim 1, wherein the control circuit (13) comprises a microcontroller (12) connected to said at least one electrode (22) via the connection terminal (23a) comprised over the upper face (16) of the substrate (5).

9. The electronic watch (1) according to claim 1, wherein the bezel (2) is manufactured in at least one dielectric and/or electrically non-conductive material.

10. The electronic watch (1) according to claim 1, wherein it is a watch in particular a smartwatch comprising the bezel (2) which is a bezel (2) entirely or partially forming a tactile interface.

11. The electronic watch (1) according to claim 1, wherein the antenna circuit (10) and the tactile control circuit (13) are located in the bezel (2) on either side of an axis of symmetry (B) passing through the centre (O) of the bezel (2).

12. The electronic watch (1) according to claim 1, wherein the cambered element (25) is partially comprised over the upper surface (16) of the substrate (5) while being connected to the connection terminal (23a).

13. The electronic watch (1) according to claim 12, wherein the end (26a) of the cambered element (25) is the only portion of said element (25) that is comprised over the upper surface (16) while being connected to the connection terminal (23a).

14. The electronic watch (1) according to claim 1, wherein said first and second portions are substantially parallel to each other.

* * * * *